No. 827,346. PATENTED JULY 31, 1906.
H. A. BUBB.
PULLEY.
APPLICATION FILED SEPT. 20, 1905.
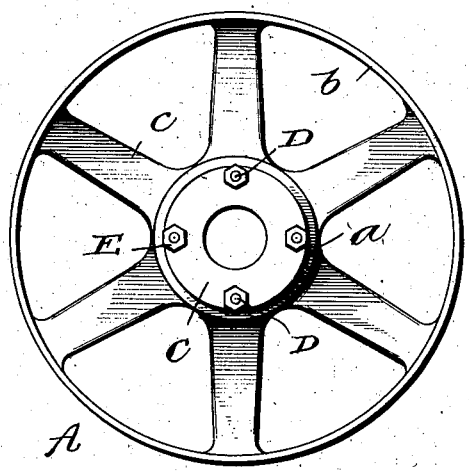
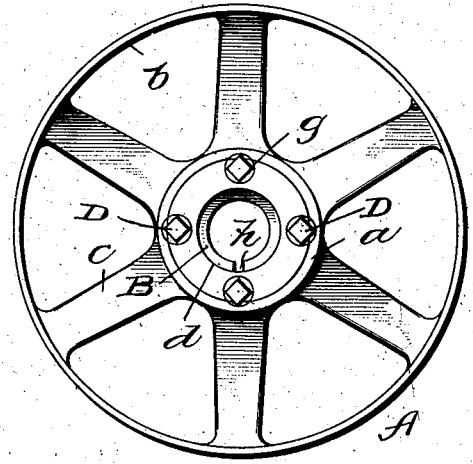
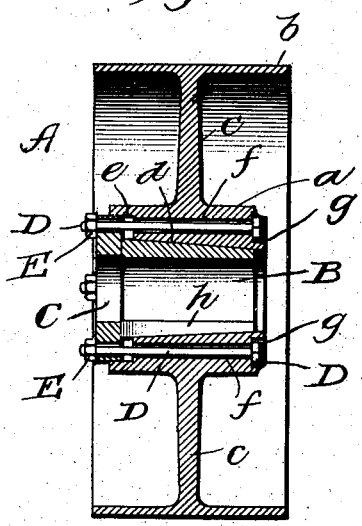
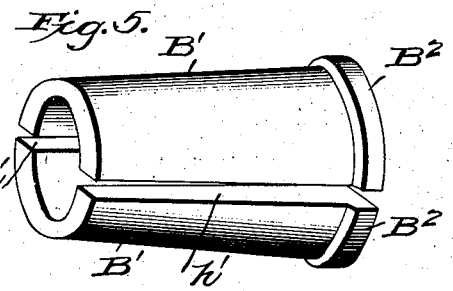
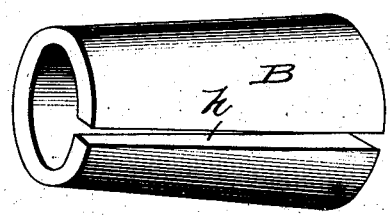
Witnesses
T. L. McLane
C. L. Tichenor
Inventor
Harry A. Bubb
By William W. Deane
his Attorney

UNITED STATES PATENT OFFICE.

HARRY A. BUBB, OF WILLIAMSPORT, PENNSYLVANIA.

PULLEY.

No. 827,346.　　　　Specification of Letters Patent.　　　　Patented July 31, 1906.

Application filed September 20, 1905. Serial No. 279,300.

*To all whom it may concern:*

Be it known that I, HARRY A. BUBB, a citizen of the United States, residing at Williamsport, in the county of Lycoming and State of Pennsylvania, have invented certain new and useful Improvements in Pulleys, of which the following is a specification.

This invention has relation to wheels—such as band-pulleys, sprockets, bevel, miter, and spur gears, sheaves, and any wheel used for transmitting power from shafts—and more particularly to means for fixing the same on shafts; and it contemplates the provision of a construction for holding a band-pulley or other wheel on a shaft by compression, and this through the medium of a bushing the thickness of which adapts it for use on shafts of various diameters.

This invention will be fully understood from the following description and claims when taken in connection with the accompanying drawings, forming part of the specification, in which—

Figure 1 is an elevation of one side of a band-pulley embodying the construction constituting the present and preferred embodiment of my invention; Fig. 2, an elevation of the opposite side of the pulley; Fig. 3, a diametrical section of the same; Fig. 4, an enlarged perspective view of the bushing removed, and Fig. 5 is a perspective view of a modified bushing removed.

Similar letters designate corresponding parts in all of the views of the drawings, referring to which—

A is a band-pulley which is illustrated as a type of wheel that may be fixed on a shaft in accordance with my invention. The said pulley may be of cast-iron, pressed steel, wood, or other suitable material without involving a departure from the scope of my invention and comprises a central portion $a$, which may be connected with its rim $b$ through the medium of spokes $c$, as shown, or other means. In the said central portion $a$ is a taper bore $d$—i. e., a bore gradually diminished in diameter from one end to the other. This bore merges at its large end into a chamber $e$, formed in one end of the central portion $a$, and from the said chamber extend bolt-holes $f$, which are grouped about or surround the taper bore $d$ and merge into countersinks $g$, formed in the opposite end of the central portion $a$ with reference to the chamber $e$.

B is an exteriorly-tapered bushing, of either iron or steel, which is preferably split longitudinally, as indicated by $h$, and is arranged in the taper bore of the pulley or other wheel, as best shown in Fig. 3.

C is an annular follower, of either iron or steel, arranged in the chamber $e$ and against the large end of the bushing B; D D, bolts extending through the follower C and the holes $f$ in the wheel and having heads disposed in the countersinks $g$ and also having threaded ends, and E E nuts mounted on the threaded ends of the bolts. By turning the said bolts through the medium of their heads in one direction or the other the pulley may be readily converted from a fast pulley into a loose pulley, and vice versa.

In the practical use of my invention the parts are relatively arranged, as shown in Fig. 3, on a shaft which passes through the bushing B and the nuts E are turned up on the bolts D. When this is done, the annular follower C and the bushing B will be moved toward the right. In consequence of this the bushing will be compressed between the wall of the taper bore in the wheel and the shaft, with the result that the wheel will be securely fixed on the shaft.

It will be gathered from the foregoing that the thickness of the bushing makes the same adjustable to shafts of different diameters; also, that while the bushing is preferably made in the manner shown and described a solid bushing may be employed to advantage when desired without involving a departure from the scope of my invention. It will further be observed by reference to the drawings that my improvements are simple and compact and do not add materially to the cost of a band-pulley or other wheel to be fixed on a shaft.

The modified bushing shown in Fig. 5 differs from that shown in Figs. 1 to 4 in that it comprises two tapered sections B', having flanges B² on their large ends and also having contiguous longitudinal edges $h'$.

Having thus fully described the invention, what I claim, and desire to secure by Letters Patent, is—

1. The combination of a wheel having a central taper bore and also having a chamber $e$ in one end in communication with the large end of the bore, an exteriorly-tapered, split bushing occupying the bore of the wheel and adapted to receive a shaft, an annular follower arranged in the chamber $e$ of the wheel and against the large end of the bushing, and an adjustable connection between the annular follower and the wheel.

2. The combination with a wheel having a central taper bore and a chamber $e$ in one end in communication with the large end of the bore and also having bolt-holes grouped about the bore and terminating in countersinks located in the opposite end of the wheel, with reference to the chamber $e$; of an exteriorly-tapered and split bushing occupying the bore, an annular follower arranged in the chamber $e$ and against the large end of the bushing, bolts extending through the followers and the bolt-holes in the wheel and having heads disposed in the countersinks of the wheel and also having threaded ends, and nuts mounted on the threaded ends of the bolts and arranged against the follower.

3. The combination with a wheel having a central taper bore and a chamber in one of its ends in communication with the large end of the bore, and also having bolt-holes grouped about the bore and terminating in countersinks located in the opposite end of the wheel, with reference to the chamber; of an exteriorly-tapered and split bushing occupying the bore, an annular follower arranged in the chamber and against the large end of the bushing, bolts extending through the follower and the bolt-holes in the wheel and having threaded ends, and nuts mounted on said ends.

In testimony whereof I affix my signature in presence of two witnesses.

HARRY A. BUBB.

Witnesses:
W. L. SCHAEFER,
D. J. HOWE.